United States Patent
Chan

(10) Patent No.: US 6,233,230 B1
(45) Date of Patent: May 15, 2001

(54) NEURAL NETWORK IS-95 RATE DETERMINATION

(75) Inventor: Joseph Chi-Ho Chan, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/177,252

(22) Filed: Oct. 22, 1998

(51) Int. Cl.⁷ ................................................. H04B 7/216
(52) U.S. Cl. ......................... 370/335; 370/342; 370/441; 370/479; 370/468
(58) Field of Search ..................................... 370/335, 342, 370/320, 441, 465, 468, 479; 375/341, 262; 714/746, 752, 756, 795

(56) References Cited

U.S. PATENT DOCUMENTS

| | | |
|---|---|---|
| 5,301,257 | 4/1994 | Tani ........................................ 706/20 |
| 5,509,020 | 4/1996 | Iwakiri et al. ....................... 714/704 |
| 5,537,410 | 7/1996 | Li ........................................ 370/465 |
| 5,671,255 * | 9/1997 | Wang et al. ......................... 375/341 |
| 5,689,511 | 11/1997 | Shimazaki et al. .................. 370/545 |
| 5,796,757 | 8/1998 | Czaja .................................. 714/789 |
| 5,878,098 * | 3/1999 | Wang et al. ......................... 375/377 |
| 5,978,414 * | 11/1999 | Nara .................................... 375/225 |
| 6,108,372 * | 8/2000 | Tidemann, Jr. et al. ............. 375/225 |
| 6,134,278 * | 10/2000 | Abrishamkar et al. .............. 375/341 |
| 6,137,845 * | 10/2000 | Wang .................................. 375/340 |
| 6,147,964 * | 11/2000 | Black et al. ......................... 370/209 |

OTHER PUBLICATIONS

Multi–Rate Detection for the IS–95 CDMA Forward Traffic Channels, Cohen, E.and Lou, H., IEEE 0–7803–2509–5/95 (1995).

Multi–Rate Detection for the IS–95A CDMA Forward Traffic Channels Using the 13KBPS Speech Coder, Cohen, E. and Lou, H., IEEE 0–7803–3250–4/96 (1996).

One Viterbi Decoder With Data Rate Estimation for IS–95 CDMA Wireless Communications, Kwon, H., Ratanamahatana,S., Shim, J., IEEE 0–7803–4198–8/97 (1997).

Rate Determination Algorithms in IS–95 Forward Traffic Channels, Ng, S., Cheng, R., Tsui, C., Ling, C, The Hong Kong University of Science & Technology, Clear Water Bay, Kowloon, Hong Kong.

\* cited by examiner

*Primary Examiner*—Chau Nguyen
*Assistant Examiner*—Soon-Dong Hyun
(74) *Attorney, Agent, or Firm*—J. William Wigert, Jr.; Crosby, Heafey, Roach & May

(57) ABSTRACT

An apparatus and the method of its operation for decoding a received, encoded data signal having a plurality of data rates, such as a CDMA signal, by means of a deinterleaver for deinterleaving the recorded, encoded signal and outputting a frame of deinterleaved symbols, a feature calculation circuit for applying a plurality of different algorithms to the frame of deinterleaved symbols to produce a corresponding plurality of output feature values which are indicative of a degree of repetition of the deinterleaved symbols, a neural network for processing the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively, a rate detection circuit for comparing the plurality of output rate determination values $y_1, y_2, \ldots y_n$ and selecting a rate corresponding to the largest output rate determination value $y_1, y_2, \ldots y_n$, and a decoder for decoding the encoded data signal at the data rate selected by the rate detection circuit.

48 Claims, 5 Drawing Sheets

NEURAL NETWORK IS-95 RATE DETERMINATION

BACKGROUND OF THE INVENTION

1. Field of the Invention

This invention relates to decoding in a spread spectrum, code division, multiple access (CDMA) communication system and, more particularly, to an apparatus and method of determining a data rate of an encoded user communication for purposes of controlling decoding of the user communication using a viterbi decoder.

2. Related Art

The CDMA system is interference limited, i.e. signals from one user create interference to the other users. Performance of the system depends on the total interference level. The system is designed so that every user transmits as little power as possible and only when it is necessary, thereby allowing the whole system to support more users.

In the IS-95 standard, the data rate depends on the speech activity and can change from frame to frame. However, the receiver does not know the data rates of the received frames. Referring to FIG. 1, a prior art CDMA receiver is shown. The user communication signal is received by a RAKE receiver and passed to three averaging circuits 14a, 14b, and 14c connected in parallel where an average of pairs, 4 tuples, and 8 tuples, respectively, is made. The output of the RAKE receiver is also supplied to the input of a first viterbi decoder 16a. The output of the averaging circuit 14a is supplied to the input of a viterbi decoder 16b. The output of the averaging circuit 14b is supplied to the input of a viterbi decoder 16c. The output of the averaging circuit 14c is supplied to the input of a viterbi decoder 16d. One output from each of the viterbi decoders 16a, 16b, 16c, and 16d is supplied to a selector circuit 24. Another output from each of the viterbi decoders 16a, 16b, 16c, and 16d is supplied through a separate encoder 18a, 18b, 18c and 18d and a separate bit error counter 20a, 20b, 20c and 20d, respectively, to a comparator 22. The comparator 22 outputs a signal to the selector 24 indicative of the which bit error counter has the least bit errors and the selector 24 then selects the output of the corresponding viterbi decoder 16a, 16b, 16c, and 16d as the output.

Therefore, conventionally, in order to decode the received frame correctly, the received frame has to be decoded four times using viterbi decoding for the four data rates 1.2 kbps, 2.4 kbps, 4.8 kbps and 9.6 kbps in rate set 1 or 1.8 kbps, 3.6 kbps, 7.2 kbps and 14.4 kbps in rate set 2. Then the four decoded frames are re-encoded and the re-encoded frames are compared with the original received frame. The embedded CRC bits or the number of bit corrections will then tell which sub-rate was transmitted. However, this method requires high complexity and power consumption because the receiver has to decode the received frame four times.

Various attempts to avoid this problem have been proposed. Channel decoding power consumption at the mobile station can be reduced by determining the sub-rate ("rate determination") prior to applying the viterbi decoder. For such methods, the viterbi decoder is applied once per frame. Papers which describe these methods are: E. Cohen and H. Lou, "Multi-rate Detection for the IS-95 CDMA forward traffic channels", *IEEE Global Telecommunications Conference,* November 1995 (hereinafter referred to as the "Cohen-Lou method"); E. Cohen and H. Lou, "Multi-rate Detection for the IS-95A CDMA Forward Traffic Channels Using The 13 kbps Speech Coder", *IEEE International Conference on Communications,* 1996; H. Kwon, S. Ratanamahatana, and J. Shim, "One Viterbi Decoder with Data Rate Estimation for IS-95 CDMA Wireless Communications", *IEEE,* 1997. Patents which describe such processes are U.S. Pat. Nos. 5,509,020 and 5,796,757. However, such prior art methods are often complex, requiring many arithmetic operations which require more power and are difficult to implement in actual practice with acceptable accuracy.

SUMMARY OF THE INVENTION

An apparatus for determining a data rate of a received, encoded signal, according to the invention includes a deinterleaver for deinterleaving the recorded, encoded signal and outputting a frame of deinterleaved symbols, a feature calculation circuit for applying a plurality of different algorithms to the frame of deinterleaved symbols to produce a corresponding plurality of output feature values which are indicative of a degree of repetition of the deinterleaved symbols, and a neural network for processing the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively. A rate detection circuit compares the plurality of output rate determination values $y_1, y_2, \ldots y_n$ and selects a rate corresponding to the largest output rate determination value $y_1, y_2, \ldots y_n$. Where the encoded signal is a CDMA signal, then there are 384 deinterleaved symbols per frame and m=0 and M=1.

Preferably, the data rates include a full data rate, a half data rate, a quarter data rate, and an eighth data rate. The feature calculation circuit calculates four output feature values, $x_1, x_2, x_3,$ and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+noise ratio.

In the preferred embodiment, each weight in the neural network between $x_j$ and a sigmoid function representative of $y_i$ is $w_{ij}$ (i references the row, j the column):

| $W_{ij} =$ | −14.8069 | 0.446381 | −7.97306 | −11.3604 |
|---|---|---|---|---|
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i =$ | 20.1445 | −17.2149 | −5.694 | −3.85499 | where $c_i$ is a bias value.

where $c_i$ is a bias value.

Another embodiment of the invention is an apparatus for decoding a received, encoded data signal having a plurality of data rates and which includes the above described rate determination apparatus.

Still another embodiment of the invention is an improved user terminal for receiving a radio frequency (RF) signal that conveys a spread spectrum, code division, multiple access (CDMA) user communication, the user communication being transmitted in frames of data bits, individual ones of the frames being transmitted with different data rates which are selected from a plurality of data rates, the user terminal including a deinterleaver for deinterleaving the recorded, encoded signal and outputting frames of deinterleaved symbols, and a decoder for decoding each frame of the user communication at an appropriate data rate, wherein the improvement is an apparatus for determining a data rate as described above and using the determined data rate to control the decoder.

A method, according to the present invention, for determining a data rate of a received, encoded signal uses the steps of deinterleaving the recorded, encoded signal and outputting a frame of deinterleaved symbols $b_0, b_1, b_2, \ldots b_N$, where N is an integer, applying a plurality of different algorithms to the frame of deinterleaved symbols to produce a corresponding plurality of output feature values which are indicative of a degree of repetition of the deinterleaved symbols, and using a neural network to process the plurality of output feature values according to a predetermined set of weights to produce a plurality of output rate determination values $y_1, y_2, \ldots y_n$, (n is an integer), each of which corresponds to a different data rate. Each y is between m and M, where m and M are predetermined minimum and maximum values, respectively. Further steps are comparing the plurality of output rate determination values $y_1, y_2, \ldots y_n$ and selecting a rate corresponding to the largest output rate determination value $y_1, y_2, \ldots y_n$. In the method of the preferred embodiment n=4, N=384, m=0 and M=1.

Where the data rates may include a full data rate, a half data rate, a quarter data rate, and an eighth data rate, the output feature value calculation step calculates four output feature values, $x_1, x_2, x_3$, and $x_4$ according to the algorithms referred to above. Each weight in the neural network between $x_j$ and $y_i$ is a value $w_{ij}$ (i references the row, j the column) given in the table above.

A method of decoding a received, encoded data signal having a plurality of data rates, includes the above described steps and further includes the step of decoding the encoded data signal at the determined data rate, preferably using a viterbi decoder. The encoded signal can be a spread-spectrum code division multiple access (CDMA) signal.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
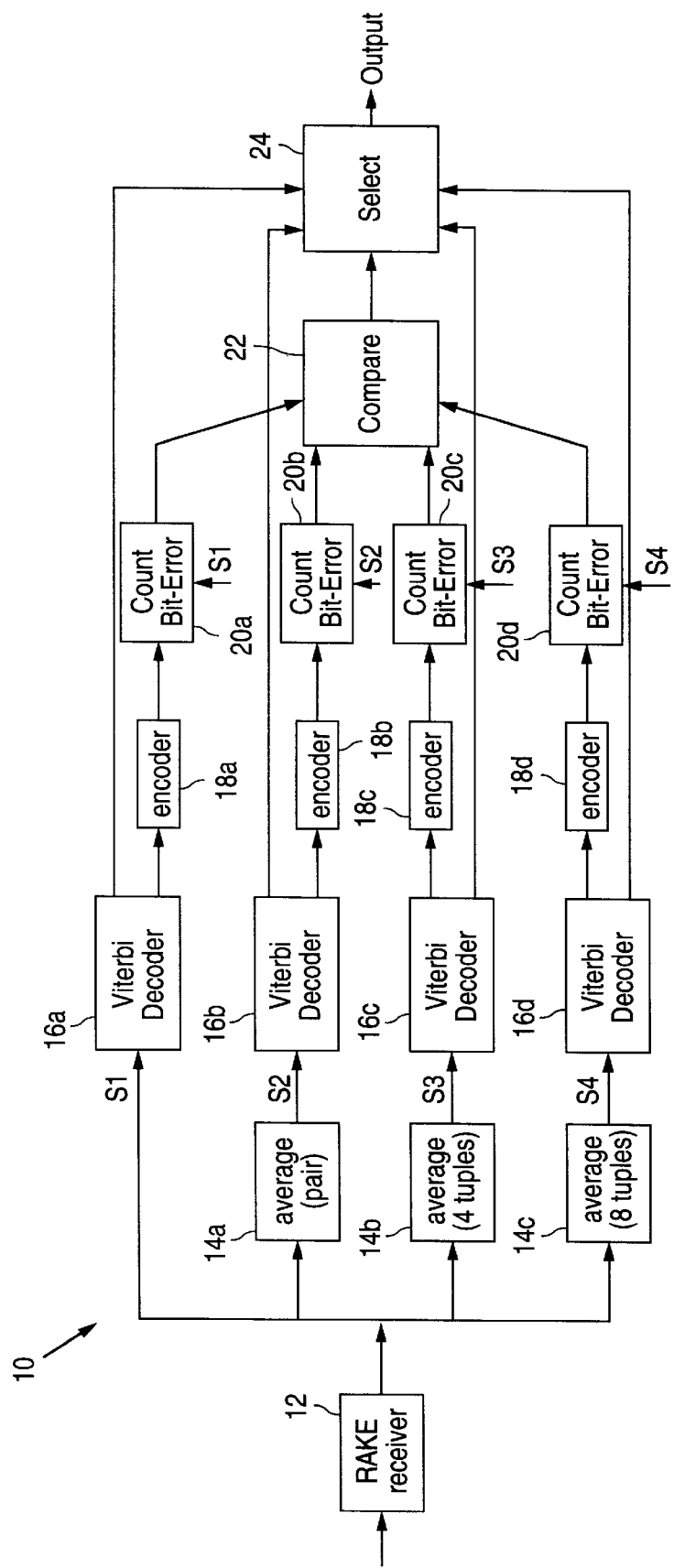
FIG. 1 is a block diagram of a conventional CDMA receiver.
Figure 2:
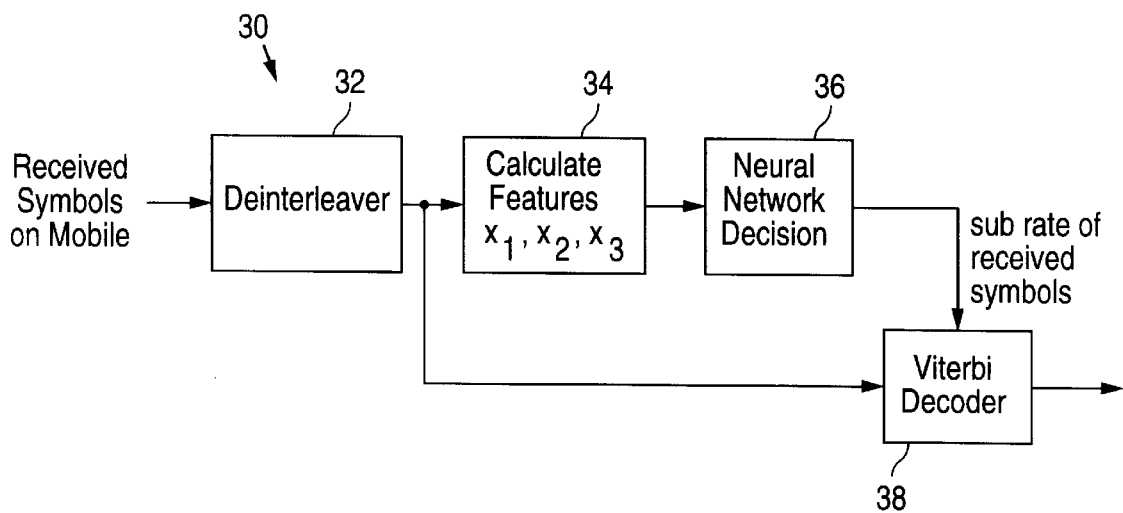
FIG. 2 is a block diagram of a CDMA receiver according to the present invention.

Referring now to FIG. 2, the receiver according to the present invention includes a deinterleaver 30 for deinterleaving the recorded, encoded signal and outputting a frame of deinterleaved symbols $b_0, b_1, b_2, \ldots b_N$, where N is an integer. The output of the deinterleaver 30 is supplied to a feature calculation circuit 34 for applying a plurality of different algorithms to the frame of deinterleaved symbols to produce a corresponding plurality of output feature values which are indicative of a degree of repetition of the deinterleaved symbols. The output of the feature calculation circuit 34 is supplied to a neural network 36 for processing the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively. The neural network 36 includes a rate detection circuit for comparing the plurality of output rate determination values $y_1, y_2, \ldots y_n$ and selecting a rate corresponding to the largest output rate determination value $y_1, y_2, \ldots y_n$. The selected rate from the neural network 36 is supplied to a viterbi decoder 38 which decodes the frame of deinterleaved symbols from the deinterleaver 30 at the selected rate.

In the new method of neural network rate determination (herein referred as NNRD) according to the present invention and for rate set 1,4, output feature values $(x_1, x_2, x_3, x_4)$ are computed for input into a neural network. These output feature values are computed from a frame of de-interleaved symbols $b_0 \ldots b_{383}$ as follows:

$$x_1 = \frac{\sum_{k=0}^{191} |b_{2k} + b_{2k+1}|}{\sum_{k=0}^{383} |b_k|}$$

-continued $$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

The output feature values $x_1$, $x_2$, $x_3$ and $x_4$ range between 0 and 1. High values of $x_1$, $x_2$, and $x_3$ indicate consistent repetition within every 2 symbols, 4 symbols and 8 symbols respectively. The feature $x_4$ serves as an indication of the noise to signal+noise ratio.

Figure 3:
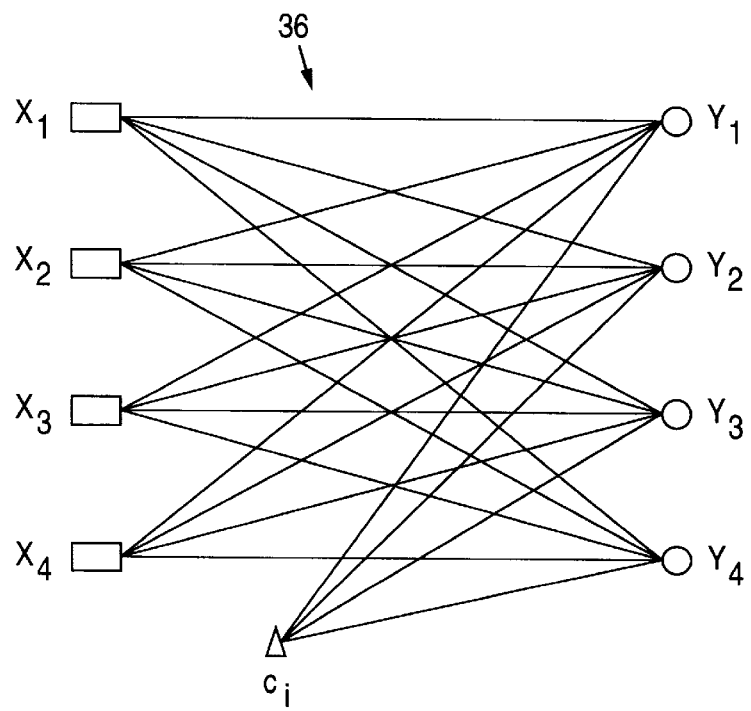
FIG. 3 is a diagram of the neural network topology utilized in the neural network depicted in FIG. 2.

The weights of the neural network 36 are computed (or "trained") to minimize the classification error. The network topology used is shown in FIG. 3. During training, the activation functions used at the output nodes are sigmoid functions ($f(x) = 1/(1+e^{-x})$). The four outputs ($y_1$, $y_2$, $y_3$, $y_4$) correspond to the rate determination decision for the 4 sub-rates (full, half, quarter and eighth, respectively). These outputs range in value between 0 and 1, where a higher value indicates that the frame from which $x_1$, $x_2$, $x_3$ and $x_4$ were calculated is more likely to be of the corresponding sub-rate. Hence, the rate determination decision would be rate k when $y_k = \mathrm{MAX}\{y_1, y_2, y_3, y_4\}$ (and k=1 for full, 2 for half, 3 for quarter and 4 for eighth rate).

A single output neural network and a multiple hidden layer neural were considered and evaluated. In a single output, the value is used to discriminate the data rate. However the performance of the single output neural network (which produced single output values of 0.1, 0.3, 0.6, 0.9 to indicate full, half, quarter, and eighth data rates, respectively) was much inferior to that of the 4 output neural network shown in FIG. 3. Multiple hidden layers did noticeably improve performance for low signal-to-noise ratio data.

The neural network weights were calculated by online backpropagation training using 42,000 patterns. Each pattern consists of the network input vector [$x_1$, $x_2$, $x_3$, $x_4$] and target output vector [$y_1$, $y_2$, $y_3$, $y_4$]. These input and output vectors were obtained from generated simulated frames of de-interleaved symbols. The frames' rates were uniformly selected from all sub-rates. The original symbols were randomly generated such that the probability of a +1 value is 0.5 and the probability of a −1 value is 0.5. Gaussian white noise was added so that the ratio of energy per symbol to noise ($E_s/N_o$) varied uniformly between −3 and 7 dB, with $E_s/N_o$ constant within each frame. Power control bits are ignored.

Figure 4:
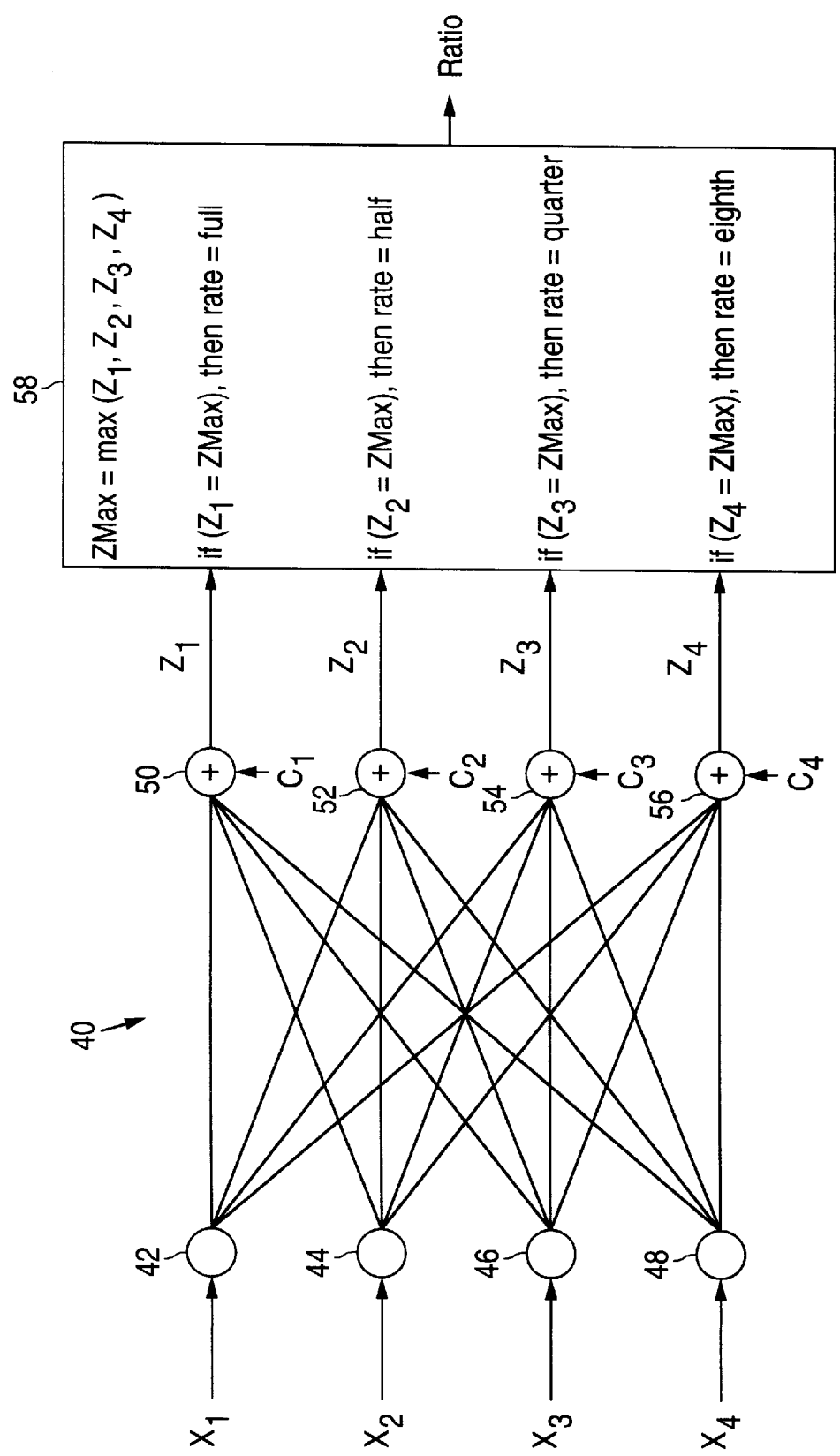
FIG. 4 is a simplified diagram of the neural network topology utilized in a preferred embodiment of the present invention.

Referring now to FIG. 4, the specific implementation of the neural network 36 is straightforward. The output feature values $x_1$, $x_2$, $x_3$, and $x_4$ are supplied to nodes 42, 44, 46, and 48, respectively, of the neural network topology 40. Each output feature value is multiplied by different weights and supplied to each of the output nodes 50, 52, 54, and 56 which are summing nodes. Separate bias values $c_1$, $c_2$, $c_3$, and $c_4$ are supplied to the nodes 50, 52, 54, and 56, respectively. The outputs $z_1$, $z_2$, $z_3$, and $z_4$ from the nodes 50, 52, 54, and 56, respectively, are supplied to a rate detection portion 58 of the neural network 36 which determines which of the outputs $z_1$, $z_2$, $z_3$, and $z_4$ is the maximum value and outputs a rate detection signal corresponding to which of the outputs is a maximum value.

One huge simplification can be obtained by the fact that only the relative magnitude of the signal into the output nodes 50, 52, 54, and 56 is needed to make the rate determination. For the inputs into the output node activation function $z_1$, $z_2$, $z_3$, and $z_4$, the output is normally computed as $y_k = \mathrm{sigmoid}(z_k) = 1/(1+e^{-z_k})$. Since the sigmoid function is monotonic increasing, when $z_k = \mathrm{MAX}\{z_1, z_2, z_3, z_4\}$, then $y_k = \mathrm{MAX}\{y_1, y_2, y_3, y_4\}$. Thus the sigmoid function of the neural network does not need to be evaluated at all!

The implementation of the rate determination neural network is given below in Matlab code.

```
%---------------------------------------------------------------------------------
% Rate determination using 0-hidden layer neural network with inputs = [x1, x2, x3, x4]
% The return value is rate   = 1 for Full rate
                             = 2 for Half rate
                             = 3 for Quarter rate
                             = 4 for Eighth rate
%---------------------------------------------------------------------------------
function rate = nnClassifyRateSimpleV(inputs)
%---------------------------------------------------------------------------------
% weights for 0.1 & 0.9 outputs (4)
INPUTS = 4;
OUTPUTS = 4;
OUTPUT_INDEX = (INPUTS);
NUMNEURONS = (INPUTS +OUTPUTS);
W_In_Out - [ −14.8069, 0.446381, −7.97306, −11.3604, 20.1445; . . .
             34.818, −19.103, −0.950632, 1.12659, −17.2149; . . .
             −20.101, 41.8083, −22.1198, 8.47819, −5.694; . . .
             −6.93596, −19.5672, 27.6596, 12.6207, −3.85499 ];
% Zero neuron sums
NEURON = zeros(NUMNEURONS,1);
% Apply inputs
NEURON(1:INPUTS) = inputs(1:INPUTS);
% Compute network outputs
j = [1:INPUTS];
for i =   1:OUTPUTS
```

-continued

```
       NEURON(OUTPUT_INDEX + i) =   NEURON(OUTPUT_INDEX + i) +...
                                    sum( NEURON(j).* W_In_Out(i,j)');
       NEURON(OUTPUT_INDEX + i) =   NEURON(OUTPUT_INDEX + i) +
                                    W_In_Out(i,INPUTS+1);
end
% find the largest output to determine rate
output = zeros(OUTPUTS,1);
output = NEURON(OUTPUT_INDEX+[1:OUTPUTS]);
[ignore,index] = sort(output);
rate = index(4);
```

The simplified implementation is shown in FIG. 4. Note that the weights can be scaled arbitrarily to simplify the multiplication. Additionally, the multiplies can be approximated using shifting and adding/subtracting.

Each weight in the neural network between $x_j$ and $z_i$ is $w_{ij}$ (where i references the row, and j references the column):

TABLE 1

| node | | 42 | 44 | 46 | 48 |
|---|---|---|---|---|---|
| 50 | $w_{ij}$ = | −14.8069 | 0.446381 | −7.97306 | −11.3604 |
| 52 | | 34.818 | −19.103 | −0.950632 | 1.12659 |
| 54 | | −20.101 | 41.8083 | −22.1198 | 8.47819 |
| 56 | | −6.93596 | −19.5672 | 27.6596 | 12.6207 |
|  | $c_i$ = | 20.1445 | −17.2149 | −5.694 | −3.85499 | where $c_i$ is a bias value.

For example, with reference to FIG. 4 and Table 1 above, an input $x_1$ supplied to node 42 is multiplied by weight −14.8069 and supplied to node 50 where it is combined with a bias value 20.1445. Similarly, input $x_2$ is multiplied by weight 0.446381 and also supplied to the node 50, and so forth. The input $x_1$ is also multiplied by the weight 34.818 and supplied to the node 52, and so forth.

The numbers of operations required to perform the rate determination by the neural network 36 are:

| | # add/subtract | # absolute values | # multiplies | # divisions |
|---|---|---|---|---|
| compute x 1 | 383 + 383 | 384 + 192 | 0 | 1 |
| compute x 2 | 383 | 96 | 0 | 1 |
| compute x 3 | 383 | 48 | 0 | 1 |
| compute x 4 | 383 + 384 | 384 | 1 | 1 |
| compute $z_1$, $z_2$, $z_3$, & $z_4$ | 16 | 0 | 16 | 0 |
| Total | 2315 | 1104 | 17 | 4 |

For comparison, the prior art Cohen-Lou method uses 3453 additions, 1344 absolute values and 3 divisions.

Figure 5:
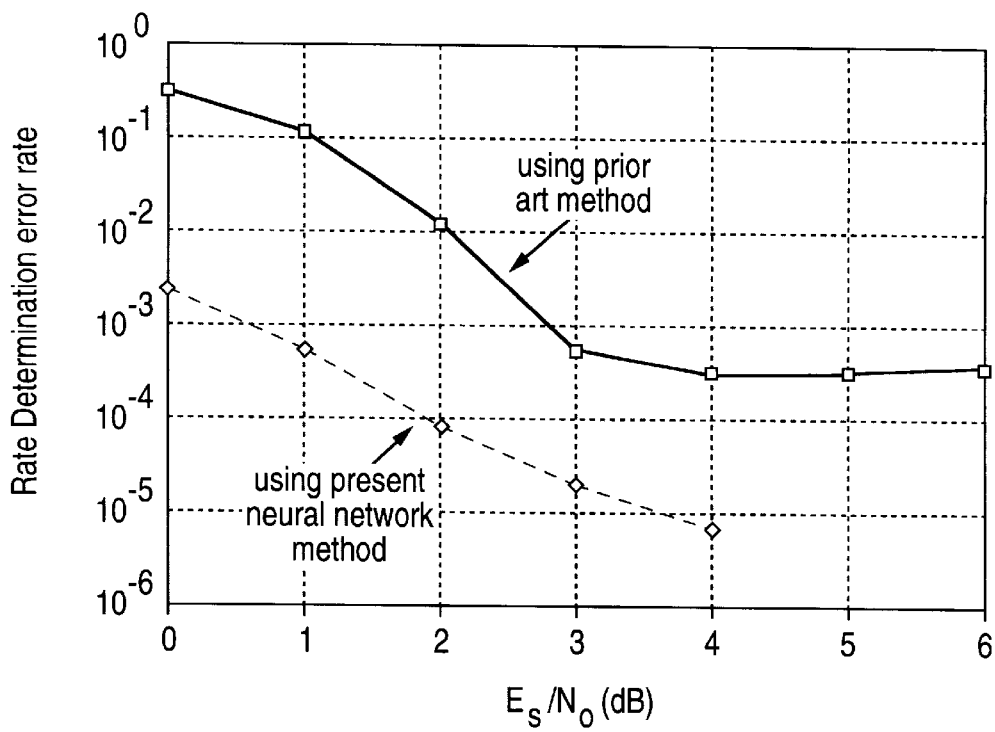
FIG. 5 is a diagram depicting an RS1 rate determination performance comparison for all sub-rates.
Figure 6A:
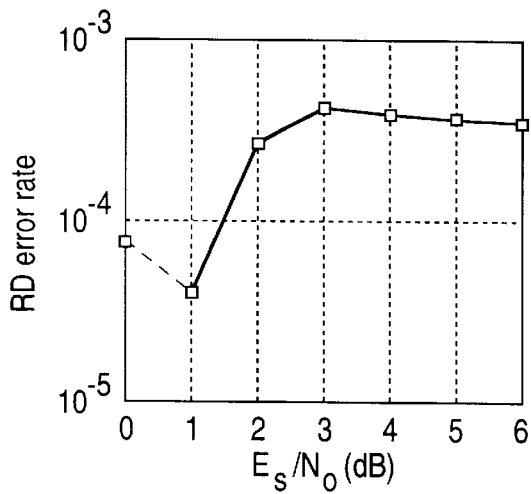
FIG. 6a is a diagram depicting an RS1 rate determination performance comparison for full rate.
Figure 6B:
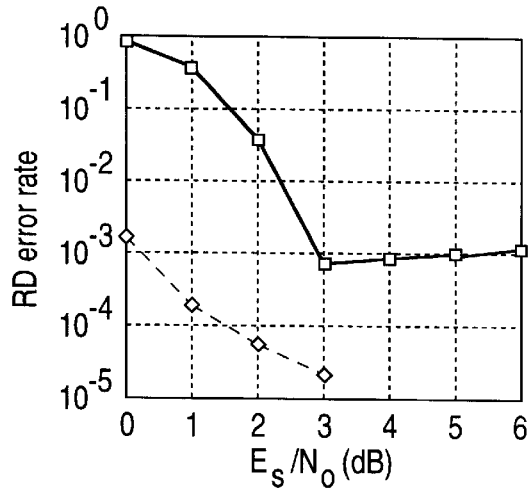
FIG. 6b is a diagram depicting an RS1 rate determination performance comparison for half rate.
Figure 6C:
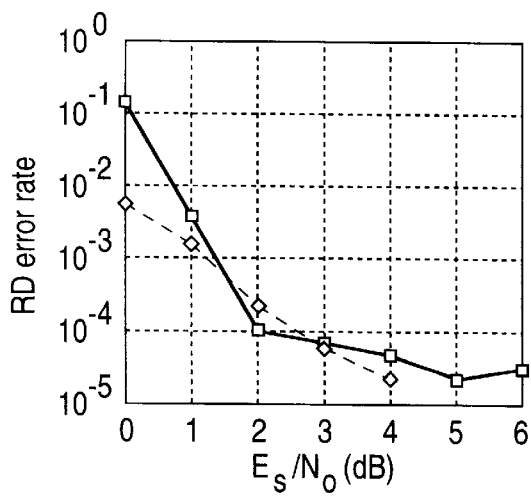
FIG. 6c is a diagram depicting an RS1 rate determination performance comparison for quarter rate.
Figure 6D:
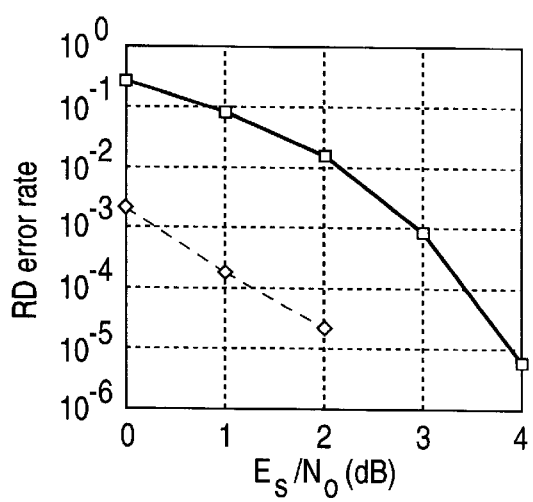
FIG. 6d is a diagram depicting an RS1 rate determination performance comparison for eighth rate.

The performance of the rate determination method of the present invention was evaluated by generating simulated frames of rate set 1 deinterleaved symbols and adding white gaussian noise. The symbol values and sub-rate were randomly selected as in the neural network training. The Cohen-Lou rate determination method and the NNRD of the present invention were used for each randomly generated frame of de-interleaved symbols. FIG. 5 and shows the rate determination error rate for all sub-rates and FIGS. 6A–6B show the rate determination error rates for individual sub-rates respectively. The improved performance is due to different statistics and use of neural network instead of limited decision rules of Cohen-Lou.

Figure 7:
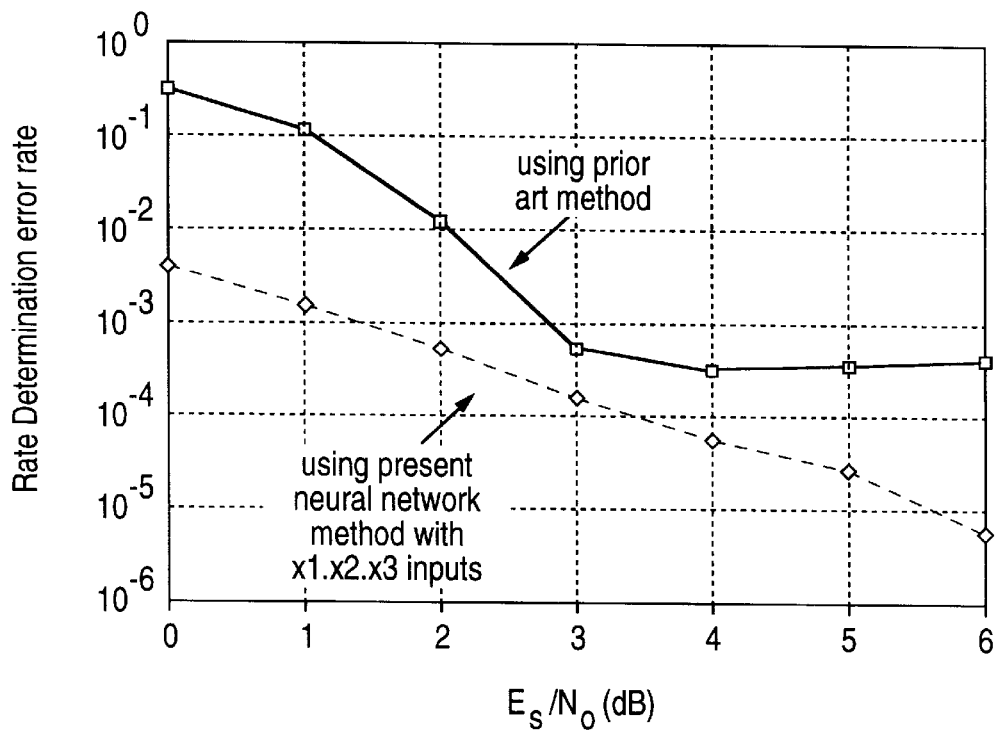
FIG. 7 is a diagram depicting an RS1 rate determination performance comparison for all sub-rates without using the fourth input $x_4$.

Even without using the fourth input $x_4$ into the neural network for reduced complexity and training accordingly, the performance is still better than that of the Cohen-Lou method as shown in FIG. 7.

Alternative realizations of NNRD include:
different neural network topologies;
omission of power control bits in $x_1$, $x_2$, $x_3$ or $x_4$ computations;
biased neural network training for actual speech data, no quarter rate, actual distribution of $E_s/N_o$;
using shifting, adding and subtracting to efficiently realize the multiplications of the neural network;
tuning for Rate Set 2;
NNRD is best applicable for IS-95 or IS-95B mobile station channel decoder and can be used for a CDMA 2000 mobile station.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. An apparatus for determining a data rate of a received, encoded signal, comprising:

a deinterleaver for deinterleaving the recorded, encoded signal and outputting a frame of deinterleaved symbols $b_0$, $b_1$, $b_2$, . . . $b_N$, where N is an integer;

a feature calculation circuit for applying a plurality of different algorithms to the frame of deinterleaved symbols to produce a corresponding plurality of output feature values which are indicative of a degree of repetition of the deinterleaved symbols;

a neural network for processing the plurality of output feature values according to a predetermined set of weights to produce a plurality of output rate determination values $y_1$, $y_2$, . . . $y_n$, each of which corresponds to a different data rate, where m≦y≦M, n is an integer and m and M are predetermined minimum and maximum values, respectively; and a rate detection circuit for comparing the plurality of output rate determination values $y_1$, $y_2$, . . . $y_n$ and selecting a rate corresponding to the largest output rate determination value $y_1$, $y_2$, . . . $y_n$.

2. An apparatus for determining a data rate of a received, encoded signal, according to claim 1, wherein the data rates include a full data rate, a half data rate, a quarter data rate, and an eighth data rate and the feature calculation circuit calculates four output feature values, $x_1$, $x_2$, $x_3$, and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+noise ratio.

3. An apparatus for determining a data rate of a received, encoded signal, according to claim 2, wherein each weight in the neural network between $x_j$ and a sigmoid function representative of $y_i$ is $w_{ij}$ (i references the row, j the column):

| $w_{ij} =$ | −14.8069 | 0.446381 | −7.97306 | −11.3604 |
|---|---|---|---|---|
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i =$ | 20.1445 | −17.2149 | −5.694 | −3.85499 | where $c_i$ is a bias value.

4. An apparatus for determining a data rate of a received, encoded signal, according to claim 1, wherein N=384.

5. An apparatus for determining a data rate of a received, encoded signal, according to claim 1, wherein m=0 and M=1.

6. An apparatus for determining a data rate of a received, encoded signal, according to claim 1, wherein the encoded signal is a spread-spectrum code division multiple access (CDMA) signal.

7. An apparatus for determining a data rate of a received, encoded signal, according to claim 1, wherein the feature calculation circuit additionally generates an output feature value indicative of a noise to signal+noise ratio.

8. An apparatus for decoding a received, encoded data signal having a plurality of data rates, comprising:

a deinterleaver for deinterleaving the recorded, encoded signal and outputting a frame of deinterleaved symbols $b_0, b_1, b_2, \ldots b_N$, where N is an integer;

a feature calculation circuit for applying a plurality of different algorithms to the frame of deinterleaved symbols to produce a corresponding plurality of output feature values which are indicative of a degree of repetition of the deinterleaved symbols;

a neural network for processing the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively;

a rate detection circuit for comparing the plurality of output rate determination values $y_1, y_2, \ldots y_n$ and selecting a rate corresponding to the largest output rate determination value $y_1, y_2, \ldots y_n$; and a decoder for decoding the encoded data signal at the data rate selected by the rate detection circuit.

9. An apparatus for decoding a received, encoded data signal having a plurality of data rates according to claim 8, wherein the decoder is a viterbi decoder.

10. An apparatus for decoding a received, encoded signal, according to claim 8, wherein the data rates include a full data rate, a half data rate, a quarter data rate, and an eighth data rate and the feature calculation circuit calculates four output feature values, $x_1$, $x_2$, $x_3$, and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+noise ratio.

11. An apparatus for decoding a received, encoded signal, according to claim 10, wherein each weight in the neural network between $x_j$ and a sigmoid function representative of $y_i$ is $w_{ij}$ (i references the row, j the column):

| $w_{ij} =$ | −14.8069 | 0.446381 | −7.97306 | −11.3604 |
|---|---|---|---|---|
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i =$ | 20.1445 | −17.2149 | −5.694 | −3.85499 | where $c_i$ is a bias value.

12. An apparatus for decoding a received, encoded signal, according to claim 8, wherein N=384.

13. An apparatus for decoding a received, encoded signal, according to claim 8, wherein m=0 and M=1.

14. An apparatus for decoding a received, encoded signal, according to claim 8, wherein the encoded signal is a spread-spectrum code division multiple access (CDMA) signal.

15. An apparatus for decoding a received, encoded signal, according to claim 8, wherein the feature calculation circuit additionally generates an output feature value indicative of a noise to signal+noise ratio.

16. An improved user terminal for receiving a radio frequency (RF) signal that conveys a spread spectrum, code division, multiple access (CDMA) user communication, the user communication being transmitted in frames of data bits, individual ones of the frames being transmitted with different data rates which are selected from a plurality of data rates, the user terminal including a deinterleaver for deinterleaving the recorded, encoded signal and outputting frames of deinterleaved symbols, and a decoder for decoding each frame of the user communication at an appropriate data rate, wherein the improvement is a data rate detector circuit comprising:

a feature calculation circuit for applying a plurality of different algorithms to the frame of deinterleaved symbols to produce a corresponding plurality of output feature values which are indicative of a degree of repetition of the deinterleaved symbols;

a neural network for processing the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively;

a comparison circuit for comparing the plurality of output rate determination values $y_1, y_2, \ldots y_n$, selecting a rate corresponding to the largest output rate determination value $y_1, y_2, \ldots y_n$, and controlling the decoder to decode the frame of the user communication at the selected rate.

17. An improved user terminal according to claim 16, wherein the data rates include a full data rate, a half data rate, a quarter data rate, and an eighth data rate and the feature calculation circuit calculates four output feature values, $x_1$, $x_2$, $x_3$, and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+ noise ratio.

18. An improved user terminal according to claim 17, wherein each weight in the neural network between $x_j$ and and a sigmoid function representative of $y_i$ is $w_{ij}$ (i references the row, j the column):

| | | | | |
|---|---|---|---|---|
| $w_{ij} =$ | −14.8069 | 0.446381 | −7.97306 | −11.3604 |
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i =$ | 20.1445 | −17.2149 | −5.694 | −3.85499 | where $c_i$ is a bias value.

19. An improved user terminal according to claim 16, wherein N=384.

20. An improved user terminal according to claim 16, wherein m=0 and M=1.

21. An improved user terminal according to claim 16, wherein the encoded signal is a spread-spectrum code division multiple access (CDMA) signal.

22. An improved user terminal according to claim 16, wherein the feature calculation circuit additionally generates an output feature value indicative of a noise to signal+noise ratio.

23. An improved user terminal according to claim 16, wherein the decoder is a viterbi decoder.

24. A method of determining a data rate of a received, encoded signal, comprising the steps of:

deinterleaving the recorded, encoded signal and outputting a frame of deinterleaved symbols $b_0, b_1, b_2, \ldots b_N$, where N is an integer;

applying a plurality of different algorithms to the frame of deinterleaved symbols to produce a corresponding plurality of output feature values which are indicative of a degree of repetition of the deinterleaved symbols;

using a neural network to process the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively; and comparing the plurality of output rate determination values $y_1, y_2, \ldots y_n$ and selecting a rate corresponding to the largest output rate determination value $y_1, y_2, \ldots y_n$.

25. A method of determining a data rate of a received, encoded signal, according to claim 24, wherein the data rates include a full data rate, a half data rate, a quarter data rate, and an eighth data rate and the feature calculation circuit calculates four output feature values, $x_1$, $x_2$, $x_3$, and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+noise ratio.

26. A method of determining a data rate of a received, encoded signal, according to claim 25, wherein each weight in the neural network between $x_j$ and a sigmoid function representative of $y_i$ is $w_{ij}$ (i references the row, j the column):

| | | | | |
|---|---|---|---|---|
| $w_{ij}$ = | −14.8069 | 0.446381 | −7.97306 | −11.3604 |
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i$ = | 20.1445 | −17.2149 | −5.694 | −3.85499 | where $c_i$ is a bias value.

27. A method of determining a data rate of a received, encoded signal, according to claim 24, wherein N=384.

28. A method of determining a data rate of a received, encoded signal, according to claim 24, wherein m=0 and M=1.

29. A method of determining a data rate of a received, encoded signal, according to claim 24, wherein the encoded signal is a spread-spectrum code division multiple access (CDMA) signal.

30. A method of determining a data rate of a received, encoded signal, according to claim 24, wherein the feature calculation circuit additionally generates an output feature value indicative of a noise to signal+noise ratio.

31. A method of determining a data rate of a received, encoded signal, according to claim 24, further including the step of calculating neural network weights by online back-propagation training of the neural network.

32. A method of decoding a received, encoded data signal having a plurality of data rates, comprising the steps of:
deinterleaving the recorded, encoded signal and outputting a frame of deinterleaved symbols $b_0, b_1, b_2, \ldots b_N$, where N is an integer;
applying a plurality of different algorithms to the frame of deinterleaved symbols to produce a corresponding plurality of output feature values which are indicative of a degree of repetition of the deinterleaved symbols;
using a neural network to process the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively;
comparing the plurality of output rate determination values $y_1, y_2, \ldots y_n$ and determining a rate corresponding to the largest output rate determination value $y_1, y_2, \ldots y_n$; and
decoding the encoded data signal at the determined data rate.

33. A method of decoding a received, encoded data signal having a plurality of data rates according to claim 32, wherein the decoding step is done with a viterbi decoder.

34. A method of decoding a received, encoded signal, according to claim 32, wherein the data rates include a full data rate, a half data rate, a quarter data rate, and an eighth data rate and the feature calculation circuit calculates four output feature values, $x_1$, $x_2$, $x_3$, and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left| |b_k| - \frac{1}{384} \sum_{j=0}^{383} |b_j| \right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+noise ratio.

35. A method of decoding a received, encoded signal, according to claim 34, wherein each weight in the neural network between $x_j$ and a sigmoid function representative of $y_i$ is $w_{ij}$ (i references the row, j the column):

| | | | | |
|---|---|---|---|---|
| $w_{ij}$ = | −14.8069 | 0.446381 | −7.97306 | −11.3604 |
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i$ = | 20.1445 | −17.2149 | −5.694 | −3.85499 | where $c_i$ is a bias value.

36. A method of decoding a received, encoded signal, according to claim 32, wherein N=384.

37. A method of decoding a received, encoded signal, according to claim 32, wherein m=0 and M=1.

38. A method of decoding a received, encoded signal, according to claim 32, wherein the encoded signal is a spread-spectrum code division multiple access (CDMA) signal.

39. A method of decoding a received, encoded signal, according to claim 34, wherein the feature calculation circuit additionally generates an output feature value indicative of a noise to signal+noise ratio.

40. An improved method of receiving a radio frequency (RF) signal that conveys a spread spectrum, code division, multiple access (CDMA) user communication, the user communication being transmitted in frames of data bits, individual ones of the frames being transmitted with different data rates which are selected from a plurality of data rates, the method including deinterleaving the recorded, encoded signal and outputting frames of deinterleaved symbols, and decoding each frame of the user communication at an appropriate data rate, wherein the improvement is a data rate detection process comprising the steps of:

applying a plurality of different algorithms to the frame of deinterleaved symbols to produce a corresponding plurality of output feature values which are indicative of a degree of repetition of the deinterleaved symbols;

using a neural network to process the plurality of output feature values according to a predetermined set of weights to produce a plurality of output rate determination values $y_1, y_2, \ldots y_n$, each of which corresponds to a different data rate, where $m \leq y \leq M$, n is an integer and m and M are predetermined minimum and maximum values, respectively;

comparing the plurality of output rate determination values $y_1, y_2, \ldots y_n$, selecting a rate corresponding to the largest output rate determination value $y_1, y_2, \ldots y_n$, and controlling the decoding to decode the frame of the user communication at the selected rate.

41. An improved method of receiving an RF signal according to claim 40, wherein the data rates include a full data rate, a half data rate, a quarter data rate, and an eighth data rate and the feature calculation circuit calculates four output feature values, $x_1$, $x_2$, $x_3$, and $x_4$ according to the following algorithms:

$$x_1 = \frac{\sum_{k=0}^{191} |b_{2k} + b_{2k+1}|}{\sum_{k=0}^{383} |b_k|}$$

$$x_2 = \frac{\sum_{k=0}^{95} |b_{4k} + b_{4k+1} + b_{4k+2} + b_{4k+3}|}{\sum_{k=0}^{383} |b_k|}$$

$$x_3 = \frac{\sum_{k=0}^{47} |b_{8k} + b_{8k+1} + b_{8k+2} + b_{8k+3} + b_{8k+4} + b_{8k+5} + b_{8k+6} + b_{8k+7}|}{\sum_{k=0}^{383} |b_k|}$$

$$x_4 = \frac{\sum_{k=0}^{383} \left||b_k| - \frac{1}{384}\sum_{j=0}^{383} |b_j|\right|}{\sum_{k=0}^{383} |b_k|}$$

where $x_1$ indicates the degree of consistent repetition within every 2 deinterleaved symbols, $x_2$ indicates the degree of consistent repetition within every 4 deinterleaved symbols, $x_3$ indicates the degree of consistent repetition within every 8 deinterleaved symbols, and $x_4$ indicates a noise to signal+noise ratio.

42. An improved method of receiving an RF signal according to claim 40, wherein each weight in the neural network between $x_j$ and a sigmoid function representative of $y_i$ is $w_{ij}$ (i references the row, j the column):

| | | | | |
|---|---|---|---|---|
| $w_{ij} =$ | −14.8069 | 0.446381 | −7.97306 | −11.3604 |
| | 34.818 | −19.103 | −0.950632 | 1.12659 |
| | −20.101 | 41.8083 | −22.1198 | 8.47819 |
| | −6.93596 | −19.5672 | 27.6596 | 12.6207 |
| $c_i =$ | 20.1445 | −17.2149 | −5.694 | −3.85499 | where $c_i$ is a bias value.

43. An improved method of receiving an RF signal according to claim 40, wherein N=384.

44. An improved method of receiving an RF signal according to claim 40, wherein m=0 and M=1.

45. An improved method of receiving an RF signal according to claim 40, wherein the encoded signal is a spread-spectrum code division multiple access (CDMA) signal.

46. An improved method of receiving an RF signal according to claim 40, wherein the feature calculation circuit additionally generates an output feature value indicative of a noise to signal+noise ratio.

47. An improved method of receiving an RF signal according to claim 40, wherein the decoding step is a viterbi decoding step.

48. An improved method of receiving an RF signal according to claim 40, further including the step of calculating neural network weights by online backpropagation training of the neural network.

* * * * *

UNITED STATES PATENT AND TRADEMARK OFFICE
CERTIFICATE OF CORRECTION

PATENT NO. : 6,233,230 B1                                    Page 1 of 1
DATED       : May 15, 2001
INVENTOR(S) : Chan It is certified that error appears in the above-identified patent and that said Letters Patent is hereby corrected as shown below:

Title page,
Item [73], Assignees: delete the comma after "Sony Electronics".

Column 3,
Line 2, delete "$x_i$;" and insert therefor -- $x_i$ --.
Line 13, delete the second instance of "where $c_i$ is a bias value.".

Signed and Sealed this

Nineteenth Day of February, 2002

Attest:

JAMES E. ROGAN
Attesting Officer       Director of the United States Patent and Trademark Office